United States Patent [19]

Shemitz

[11] 4,343,117

[45] * Aug. 10, 1982

[54] ASSEMBLABLE STRUCTURES

[75] Inventor: Norman S. Shemitz, Woodbridge, Conn.

[73] Assignee: Shem Safe Incorporated, Milford, Conn.

[*] Notice: The portion of the term of this patent subsequent to Nov. 11, 1997, has been disclaimed.

[21] Appl. No.: 139,452

[22] Filed: Apr. 11, 1980

[51] Int. Cl.³ .................... E04B 1/38; A63H 33/10; F16B 1/00

[52] U.S. Cl. .......................................... 52/90; 46/31; 52/285; 52/36; 52/582; 52/DIG. 10; 211/118; 403/291; 403/405

[58] Field of Search .................... 52/90, 36, 285, 583, 52/DIG. 10, 582; 403/291, 405; 211/118, 186, 189; 362/352; 46/1, 21, 26, 31

[56] References Cited

U.S. PATENT DOCUMENTS

| 3,120,078 | 2/1964 | Bessinger | 46/31 |
| 3,271,895 | 9/1966 | Sorensen | 46/26 X |
| 3,660,952 | 5/1972 | Wilson | 52/DIG. 10 |
| 3,827,177 | 8/1974 | Wengel | 46/31 |
| 3,899,259 | 8/1975 | Boice | 403/405 |
| 3,913,289 | 10/1975 | Recker | 46/31 X |
| 3,955,510 | 5/1976 | Kinik et al. | 46/31 |
| 4,233,656 | 11/1980 | Shemitz | 362/352 |
| 4,295,187 | 10/1981 | Shemitz | 362/352 |

Primary Examiner—J. Karl Bell
Attorney, Agent, or Firm—Larson & Taylor

[57] ABSTRACT

Structures including buildings, furniture items or room partitions are formed by assembling panels and releasably connecting the panels together with a support system comprising collars on the corners of the panels and elastic members interconnecting these collars so as to hold the structure together into a predetermined form by virtue of the tension of the stretched elastic members. Structures formed by this system include building structures such as small outdoor shelters, furniture items such as display cases, bookshelves, tables and containers and room partitions of virtually any arrangement, and toys.

37 Claims, 26 Drawing Figures

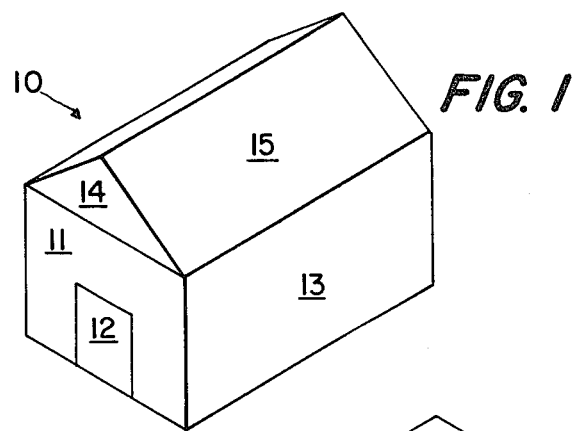
FIG. 1
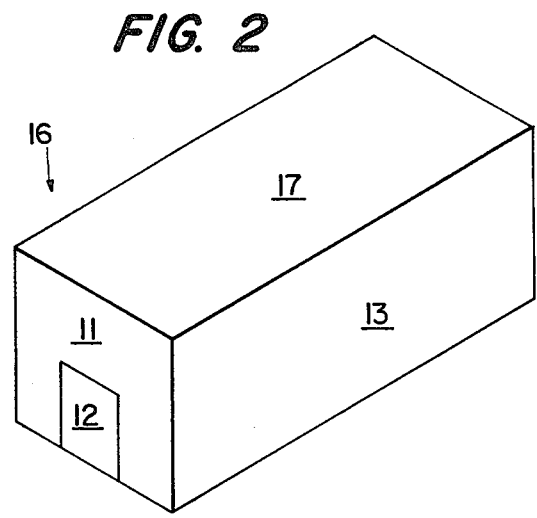
FIG. 2
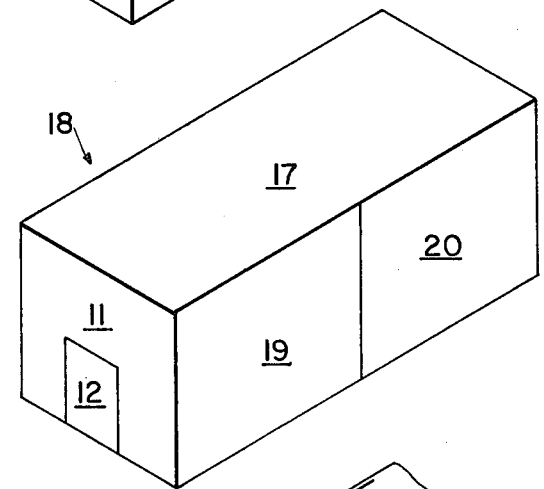
FIG. 3
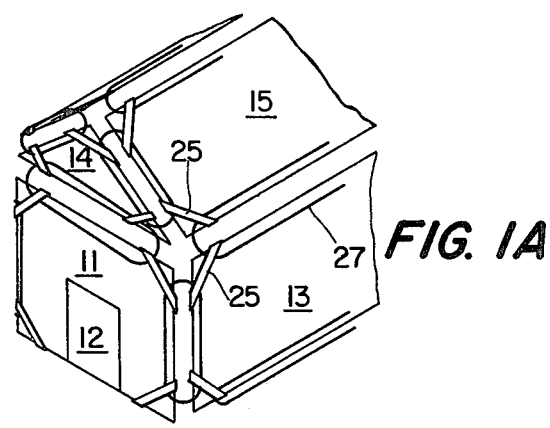
FIG. 1A
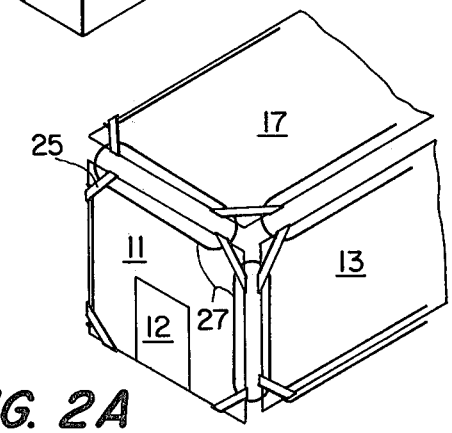
FIG. 2A
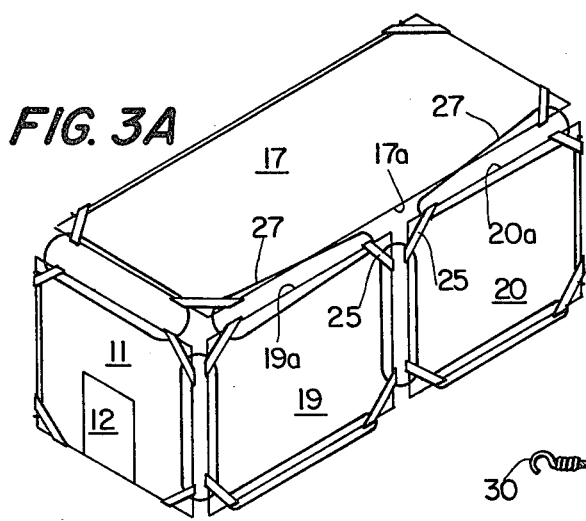
FIG. 3A
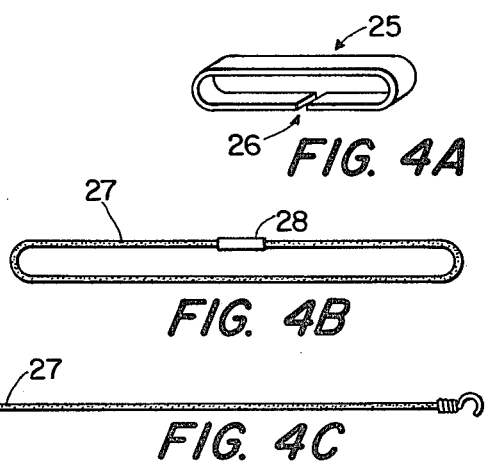
FIG. 4A
FIG. 4B
FIG. 4C

ASSEMBLABLE STRUCTURES

RELATED APPLICATION

This is an improvement of the subject matter described in Applicant's prior, copending applications Ser. No. 950,592, filed Oct. 12, 1978, now U.S. Pat. No. 4,233,656 and an application entitled "Assemblable Container" filed Feb. 27, 1980, Ser. No. 125,168, now U.S. Pat. No. 4,295,187.

TECHNICAL FIELD

The present invention relates to structures such as small building structures, furniture items, room partitions and the like; and toys are also included in the present definition of "structures", these being similar to the larger structures, except that they are generally smaller; and in particular, the present invention relates to readily assemblable and disassemblable structures comprising a plurality of separate panels.

BACKGROUND OF THE INVENTION

The present invention relates to structures comprising a plurality of individual panels connected together by a support system into a predetermined configuration. The types of structures which can be formed in accordance with the present invention are virtually limitless. For example, larger panels can be utilized to form building structures, generally but not necessarily of an outdoor and/or temporary nature such as a tool shed, a doghouse, a playhouse, a garden shelter, a storm shelter, an emergency shelter, etc. Furniture items which can be formed in accordance with the present invention would include for example cabinets, bookshelves, display cases, tables, etc. Room partitions of virtually any arrangement can be formed in accordance with the present invention, for example, to form room dividers, office partitions, trade show booths, etc. Toys would include smaller versions of the above described structures as well as a set of polygonal panels with cords and collars from which the user could make any number of various polyhedron shapes.

All of the kinds of structures which can be made in accordance with the present invention, other than toys, are of course well known per se. However, as known heretofore, such structures have either been manufactured (a) in the final configuration in which the item tends to be relatively bulky, thereby increasing inventory and freight costs associated with storing and shipping such structures or (b) in a knocked-down unassembled form, in which cases the disadvantages have existed that the task of assembling them has been quite complex and/or said structures, once assembled, did not have a high level of strength and/or rigidity and/or assembly of such structures needed extensive use of tools and related skills. In still other cases, some of the structures to which the present invention is applicable have not been preassembled at all, but rather, simply formed from basic raw materials at the point of use, as for example in the case of certain building structures and room partitions. With respect to toys, while various kinds of assemblable and disassemblable toys are known, none are known using the features of the present invention.

In the previous applications identified above, there is described the concept of an assemblable lamp shade and assemblable containers which are made by assembling individual panels together by a support system of the type utilized in the present invention. Prior to my said previous applications, there were several patents, including U.S. Pat. No. 4,079,245, showing lamp shades formed of individual panels, but wherein the individual panels were held together by rigid connecting elements rather than by an elastic tension support system, such that they had to be preassembled by the manufacturer and could not be readily assembled by the ultimate user.

SUMMARY OF THE INVENTION

It is the purpose of the present invention to provide a structure of the type comprising separate panels, held together by a support system, wherein the above described and other disadvantages of the prior art are overcome.

This purpose of the present invention is achieved by providing structures having a support system made up of stiff, i.e. essentially non-stretchable collars and elastic members which can be supplied to the ultimate consumer separately from the panels and then easily assembled by the consumer in a matter of minutes, without tools, to provide a structure of the desired configuration. Consequently, panels made in accordance with the present invention of virtually any size and configuration can be shipped and stored in a highly compacted form with the panels stacked together and the collars and elastic members provided therewith, the latter taking up an insignificant overall volume. Consequently, the present invention provides the advantages that as compared with structures known heretofore, durable and in certain cases aesthetically pleasing structures of all sizes can be provided to the ultimate consumer in a compacted form to be assembled by the ultimate consumer, thereby substantially reducing manufacturing costs, shipping costs and breakage; and the assembled structure will have the desired strength and rigidity for its intended purpose.

One application of the present invention is for building structures of the type having side walls and a roof. The uses of such structures are virtually limitless, but the common uses would include a tool shed, a playhouse, a doghouse, a garden shelter, a storm shelter or a general emergency shelter. So long as the building structure is made from panels which can be connected together by the support system of the present invention, the building structure can be of any size and shape, including for example either a gabled roof or a flat roof. Additionally, while such buildings would generally be free of internal partitions, such buildings could include internal partitions formed in accordance with the structural details described later in this application in conjunction with cabinets, bookshelves, display cases and room partitions.

Other applications of the present invention include furniture items formed with a group of first generally parallel panels connected to opposite end panels extending perpendicularly to the planes of the first group of panels. Such items may further include a back panel lying in a plane perpendicular to both the first group of panels and the end panels. Preferably, the said first panels will extend in horizontal planes. This item, in the absence of the back panel, may take the form of a table or an open shelving structure which could be used as a bookshelf, as a display case, etc. With the back panel in place the furniture items may again take the form of a shelf, but also a cabinet or display case. Additionally, if this furniture item is turned with the back panel forming the bottom, it can comprise an open top partitioned container. While the furniture item would generally include a single end panel at each end, so as to provide the requisite vertical stability, it is also possible to provide the end panel as a set of coplanar, end-to-end panels. Such an arrangement would be suitable, for example, where the furniture item either does not need a significant amount of vertical stability (for example, where it would be hung from above). Conversely, in a case where greater vertical stability is needed, separate strengthening means can be provided.

Another application of the present invention is to make room partitions and dividers, wherein large panels can form area dividers and partitions of virtually any configuration from a simple screen type room divider to a complex system for partitioning off a large area into smaller work areas.

Still another application of the present invention is as a toy, i.e. either smaller models of the above discussed structures or a kit with separate small polygonal pieces, cords and collars for assembly into various shapes.

In accordance with a preferred embodiment of the present invention, for any of its various applications, the support system comprises essentially non-stretchable collars placed onto the corners of the panels with elastic members interconnecting the collars together such that groups of adjacent collars on juxtaposed panels are connected together at their proximate ends by said elastic members while at its other end the elastic members connect together another collar or group of adjacent collars, wherein the elastic members are stretched between the two groups of collars, thereby releasably holding all of the collars in place against their respective panels, in turn holding all of the panels together under tension to provide a structure rigidly held together into its desired configuration.

The collars may preferably be formed as elongated members bent into a loop with the ends thereof close together but not connected to each other, wherein the elastic members, which may be formed as closed loops, can be snapped into the interior of the collars between the close but not connected ends. It may be preferable in other situations, especially in applications using relatively large panels, to connect the collars together by the well known elastic cords having hooks at both ends, commonly referred to as "shock cords" or "Bundgee cords", as is commonly used for securing luggage or other items onto vehicles such as the top of station wagons, the backs of bikes or motorcycles, etc. Collars used with such elastic cords may of course be completely closed loops.

In many cases, forming structures in accordance with the present invention becomes considerably more complex than forming simple polyhedrons such as lighting fixtures and simple containers. The reason for this is that in the former case panel corners always meet other panels only at their corners. However, structures formed in accordance with the present invention often require different and more complex panel intersections including for example a plurality of adjacent, colinear edges on adjacent panels meeting along a single edge of a larger panel; panel edges abutting middle portions of other panels, either perpendicularly or at some other angle thereto, or a plurality of three or more panel edges meeting along a common line. The present invention includes structural details for connecting panels together into the desired structure even when these more complex panel intersections are required.

The objects and advantages of the present invention will become apparent from the detailed description which follows of preferred embodiments of the present invention.

BRIEF DESCRIPTION OF THE DRAWINGS

The present invention will now be described with reference to preferred embodiments of the present invention which are to be read together with the accompanying drawings wherein:

FIG. 1 is a perspective view of a building structure which can be formed in accordance with the present invention.

FIG. 1A illustrates a portion of the building of FIG. 1 with the panels separated and illustrating schematically the elements of the support system used to form this building.

FIG. 2 is a perspective view similar to FIG. 1 but showing another building configuration which can be made in accordance with the present invention.

FIG. 2A illustrates a portion of the building of FIG. 2 with the panels separated and illustrating schematically the elements of the support system used to form this building.

FIG. 3 is a perspective view similar to FIGS. 1 and 2 showing still another building configuration which can be made in accordance with the present invention.

FIG. 3A illustrates a portion of the building of FIG. 3 with the panels separated and illustrating schematically the elements of the support system used to form this building.

FIG. 4A is an enlarged perspective view of a collar which can be used in the support system of the present invention.

FIG. 4B illustrates an elastic member which can be used in the support system of the present invention.

FIG. 4C illustrates another type of elastic member which can be used in the support system of the present invention.

FIG. 5 is a perspective view of a furniture item which can be formed in accordance with the present invention and which, depending on the selection of panels and whether or not a back panel is used, may be either a table, open or closed back shelving, or a cabinet or display case or the like.

FIGS. 7A, 7B and 7C are partial views of panels showing alternative collar arrangements for use at locations where panels intersect, wherein FIG. 7A is a perspective view of a horizontal panel intersecting intermediate the ends of a vertical panel, FIG. 7B is a front elevational view similar to FIGS. 6A and 6B and FIG. 7C is a partial side view showing certain panel intersections.

DETAILED DESCRIPTION OF THE PREFERRED EMBODIMENTS

Figure 5:
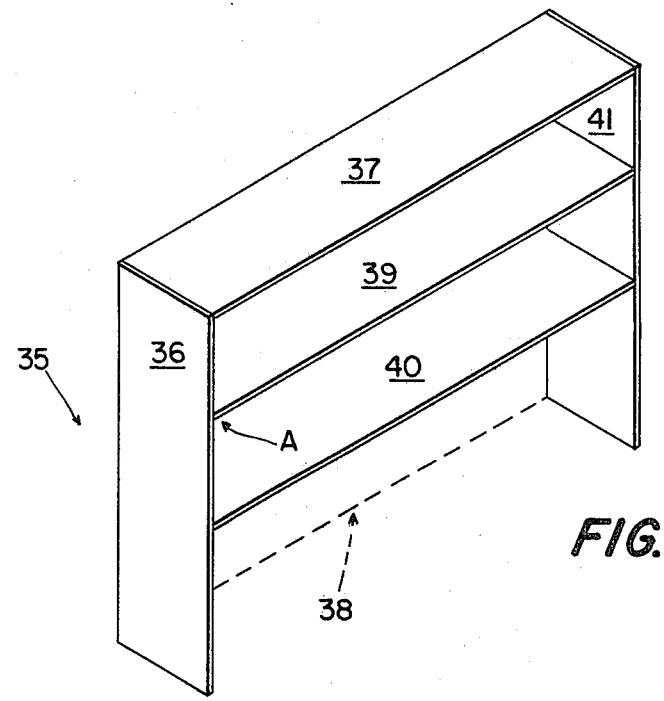

Referring now to the drawings, like elements are represented by like numerals throughout the several views.

Before describing each of the illustrated embodiments, it will be helpful to first categorize and briefly describe certain types of panel intersections (other than the simple intersection of corners only as in the prior applications) which are required to form various ones of the structures of the present invention:

Type I. Two colinear edges, i.e. edges of two adjacent end-to-end panels positioned adjacent a parallel single uninterrupted edge of a third panel. (See for example FIG. 3A, panels 19, 20 and 17).

Type II. The whole edge of a first panel abuts the middle of a second panel which lies perpendicularly or at some other angle to the plane of the first panel. (See FIG. 6, the intersection of panel 39 with panel 36.)

Type IIA. Same as type II with a third backing panel perpendicular to both the first and second panels and abutting both of them. (See FIG. 6, panels 39 and 36 with third panel 38).

Type III. A group of three or more panel edges meeting along a common line. (See FIG. 9, the intersection of panels 46, 47 and 51.)

Type IIIA. Same as type III, but with another panel perpendicular to and meeting some or all of the panels of the said group of panels. (See FIG. 9, panels 46, 47 and 51 with other panel 60'.)

FIGS. 1 through 3 show typical building structures which can be formed in accordance with the present invention. These of course are only examples and virtually any shape can be made in accordance with the present invention so long as it is formed with panels using the support system of the present invention. FIG. 1 illustrates a building 10 having a front panel 11 with a door 12 formed therein, a back wall similar to front wall 11 and a pair of side walls 13. In this embodiment the roof comprises a pair of gables 14 and a pair of inclined surfaces 15. Although the gables 14 are illustrated as separate from the front panels 11, they can be formed integral with said front panels. FIG. 2 simply illustrates another building structure 16 provided with a flat roof 17 instead of the gabled roof of building 10. FIG. 3 illustrates still another building 18 which is similar to building 16 except that in this case the longer side walls 13 are replaced by a pair of panels 19 and 20 which would be connected to the roof 17 by a type I connection.

Before describing FIGS. 1A–3A, reference is made to FIGS. 4A–4C which illustrate the components of the support system of the present invention. The nonstretchable collars are preferably formed as metallic collars 25 as shown in FIG. 4A, formed from a length of flat metallic material bent into the shape of the loop with the ends close together at slit opening 26. With this type of collar it would be preferable to use the elastic member 27 shown in FIG. 4B. These loops are preferably formed from a length of elastic material closed at a clamp 28. This type of cord would be assembled onto the collar 25 by simply pushing the cord against the ends of slit opening 26 of collar 25 to snap a length of elastic member 27 into the interior of collar 25. Alternatively, the elastic members may comprise the well known shock cords 27 having hooked ends 30. When using this type of elastic member, it is of course possible to use a collar which is formed as a completely closed loop since the hooks 30 can simply be hooked over the ends of such a collar.

In all of the detailed descriptions to follow, the numeral 25 will refer to the collar, whether it is of the type having the unconnected ends 26 or of a solid closed configuration, and the numeral 27 will refer to an elastic cord, whether of the closed loop type shown in FIG. 4B or the shock cord type shown in FIG. 4C. Either arrangement can be used with any of the structures described herein although as a general consideration it will be understood that the solid loops with the shock cords are preferable for the larger structures. However when assembling large panels, where three panels come together it is preferable to use collars with the slit opening with endless cords. In this case the collars and cords would of course be large and strong.

Referring now to FIG. 1A, the various panels of FIG. 1 are separated to more clearly illustrate the positioning of collars 25 on the corners of the panels in the manner by which the elastic cords 27 pass through the collars and engage different groups of adjacent collars are respective ends of the cords, thereby pulling the entire building into the desired configuration. The portions of building 10 not shown in FIG. 1A will of course be made in a manner identical to the portions which are illustrated. Also, while the elastic members 27 shown in FIG. 1A appear to be of the endless loop type of FIG. 4B, this is actually provided only for purposes of illustration in this expanded view, and in fact the cords of FIG. 4C could be more suitable for a large structure such as a building structure.

Figure 7A:
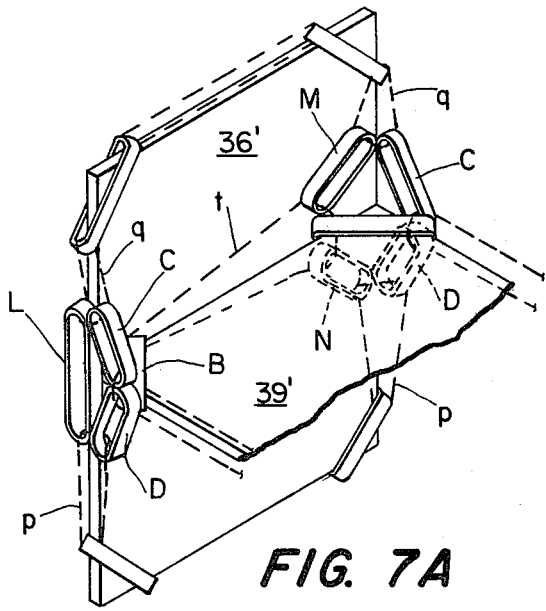
Figure 7B:
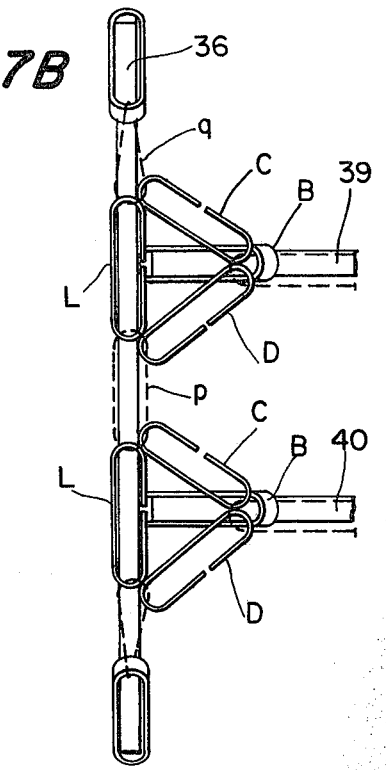
Figure 7C:
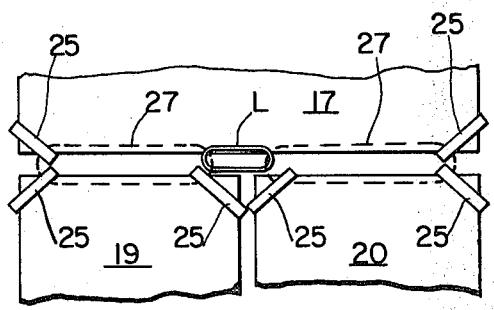

In a relatively self-explanatory manner, FIGS. 2A and 3A illustrate the elements of the support system holding together the panels to form the buildings of FIGS. 2 and 3. FIG. 7C illustrates an alternative collar arrangement to that shown in FIG. 3A. Specifically, if operating conditions so dictate, e.g. if it is desired to maintain a more perfect alignment of the two cords 27 along the tops of panels 19 and 20, it would be possible to include an additional collar L, the sole purpose of which is to interconnect and hence better align those two cords. Since this collar is not connected to any panel, this type of collar shall be referred to hereinafter as a "floating collar".

FIG. 5 illustrates a furniture item 35 which can actually be formed as quite a number of different specific furniture items. As illustrated, it includes a plurality of generally parallel first panels 37, 39 and 40, and a single end panel at each end, i.e. 36 and 41. This furniture item may include a back panel which is shown in dotted lines at 38. By eliminating the back panel and preferably one of the panels 39 or 40, this item may be used as a table having an upper surface 37 and with the remaining panel 39 or 40 serving as a horizontal support element. Alternatively, as shown in FIG. 5 without the back panel the furniture item would form a shelving structure, and it is of course understood that while only three shelves 37, 39 and 40 are illustrated, any number of shelves may be provided. When the back panel 38 is added, the furniture item takes on the shape of a cabinet or display case. Also, while only a single set of first shelves and end shelves are shown, the system can be extended laterally to add other groups of shelves as represented by the additional shelf on the left hand side of FIG. 6B. Alternatively, the furniture item of FIG. 5 with the back panel can be turned over with the back panel forming the bottom to form an open top, partitioned container.

Figure 6A:
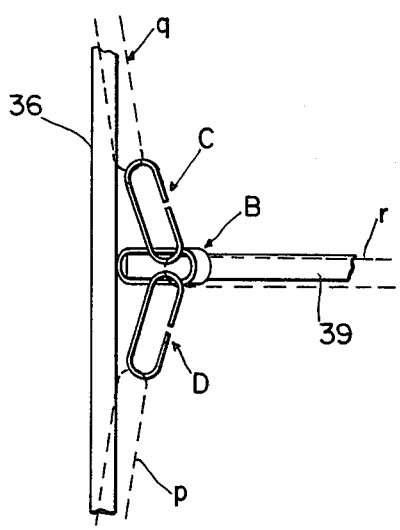
FIG. 6A is a schematic, front elevational view of a portion of FIG. 5, taken in the direction of the arrow A in FIG. 5, showing the intersection of two of the panels therein.
Figure 6B:
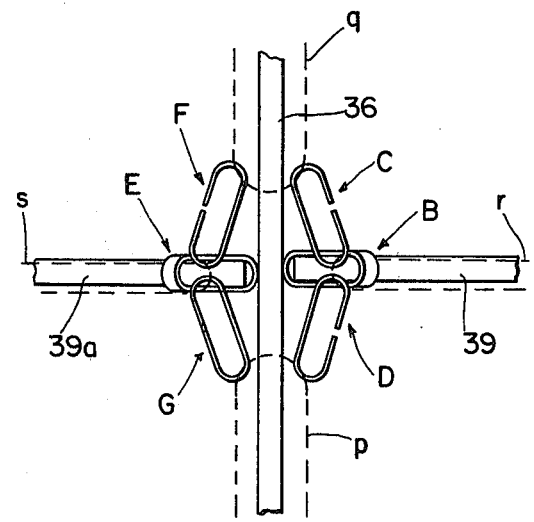
FIG. 6B is similar to FIG. 6A but includes a additional panel not present in FIG. 5.
Figure 6:
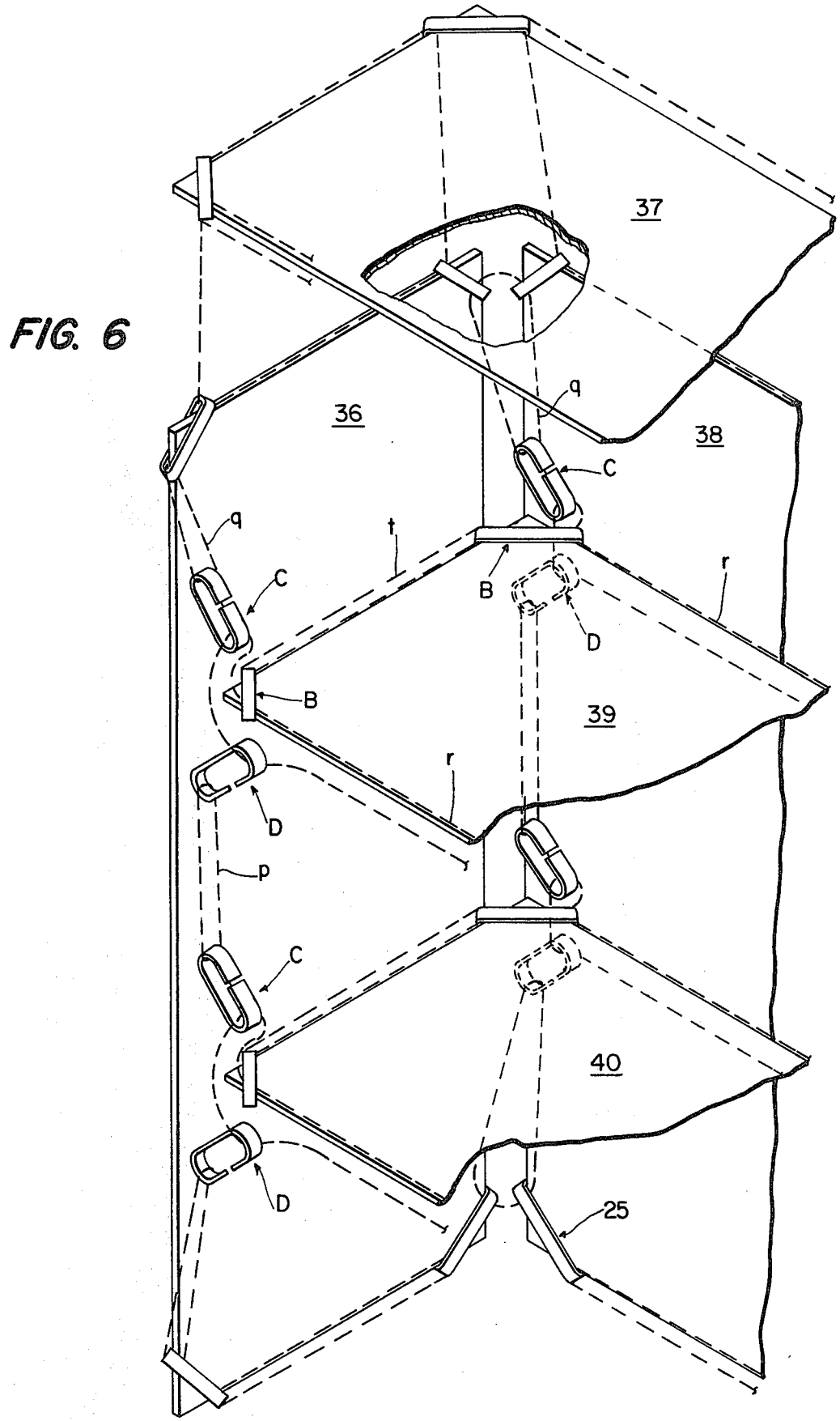
FIG. 6 is an enlarged perspective exploded view of one end of the furniture item of FIG. 5, and including the back panel, and illustrating the elements of a support system for holding this furniture item together.

Referring now to FIG. 6, the connection of upper panel 37 to the panels 36 and 38 involves only the simplified corner to corner intersection as utilized in my prior applications. However, the connections of panels 39 or 40 to the panels 36 and 38 are somewhat complex. These comprise type II and type IIA intersections, respectively. For convenience, the collars are referred to using capital letters while the cords are referred to by small case letters, starting with the letter "p".

At the front of this intersection, a regular corner collar B is placed onto panel 39, and a pair of additional collars C and D, referred to hereinafter as "strut collars" extend at an angle from the plane of shelf 39 up and down, respectively, to the plane of panel 36. This is best illustrated in FIG. 6A. As illustrated, elastic member p engages collar D and pulls it downwardly, elastic member q engages collar C and pulls it upwardly, cord r engages all three collars B, C and D, and extends therefrom along the front of the shelf while cord t engages collar B and pulls it rearwardly along the side of shelf 39.

The back of FIG. 6 illustrates a type IIA connection, i.e. a connection similar to the front of FIG. 6 but with the addition of back panel 38. It should be understood that this connection is identical in virtually all respects to the type IIA connection in that it involves no additional collars or elastic elements other than the panel 38 itself and the corner collars thereon. It is only necessary in this case to link the upper and lower elastic members with the collars 26 on the corners of panel 38.

FIG. 6B illustrates how the embodiment as described with respect to FIGS. 5, 6 and 6A can be extended to add further sections of first panels to the opposite side of end panel 36 and this of course can be extended indefinitely. The new panel coming in from the left which is designated as 39a would include a corner collar E similar to collar B and a pair of strut collars F and G identical to strut collars C and D. An additional front elastic member s would be provided along the front edge of panel 39a engaging collars E, F and G in the same manner as the elastic member r runs along the front of panel 39 and engages collars B, C and D.

While FIGS. 6, 6A and 6B illustrate type II intersections having strut collars C and D which are located essentially in planes perpendicular to the panels 36, 39 and 40, other collar arrangements are possible. FIG. 7A is a partial perspective view showing a pair of hypothetical intersecting panels 36' and 39'. At the front corner (the left hand side of FIG. 7A) there is provided in addition to the collars C and D a floating collar L of the type shown in FIG. 7C and discussed above as an alternative to the arrangement shown in FIG. 3A. FIG. 7B illustrates how this principle of a floating collar would be utilized where there was provided a plurality of horizontal shelves 39 and 40 as in FIG. 6. In this case cords intermediate the ends of panel 36 would simply interconnect successive floating collars.

Still another collar arrangement is shown in FIG. 7A at the rear corner of the intersection of panels 36' and 39'. Here, in addition to the strut collars C and D located essentially in a vertical plane through the back of shelf 39', there is provided additional strut collars M and N extending in a plane along the surface of panel 36', i.e. a vertical plane through the left hand edge of panel 39'. Although not shown, this corner with struts C, D, M and N could also include a floating collar L interconnecting cords q and p. Alternatively, the corner between a horizontal panel such as 39' and a vertical panel such as 36' can include only the strut collars M and N extending along the end of the panel without either a floating collar or the other strut collars C and D.

By way of summary, therefore, it will be understood that at the intersection of a horizontal panel and a vertical panel many different collar arrangements are possible including only front struts, only end struts, only floating collars or any combination thereof. The selection of precisely which types of collars or combination of collars are to be used will depend on the specific circumstances of each individual case and this will depend in turn on the strength and rigidity required for that particular case, the direction in which rigidity is required and the extent to which alignment of adjacent panels is required. In a single structural item different collar combinations may be required at different locations. For example if FIG. 7A represented the intersection of the side wall of an open book shelf with one of the shelves, if a type of connection having greater rigidity such as the ones having collars, C, D, M and N were used at the back of shelf 39', then a less rigid collar arrangement such as the one shown at the left hand side of FIG. 7A or the one shown in FIG. 6 with just collars C and D could be used at the front corner of the shelf 39'. Also, it will be apparent that the rigidity requirements of furniture and building structures will be greater than those required for structures which will take less stress such as toys.

Figure 8:
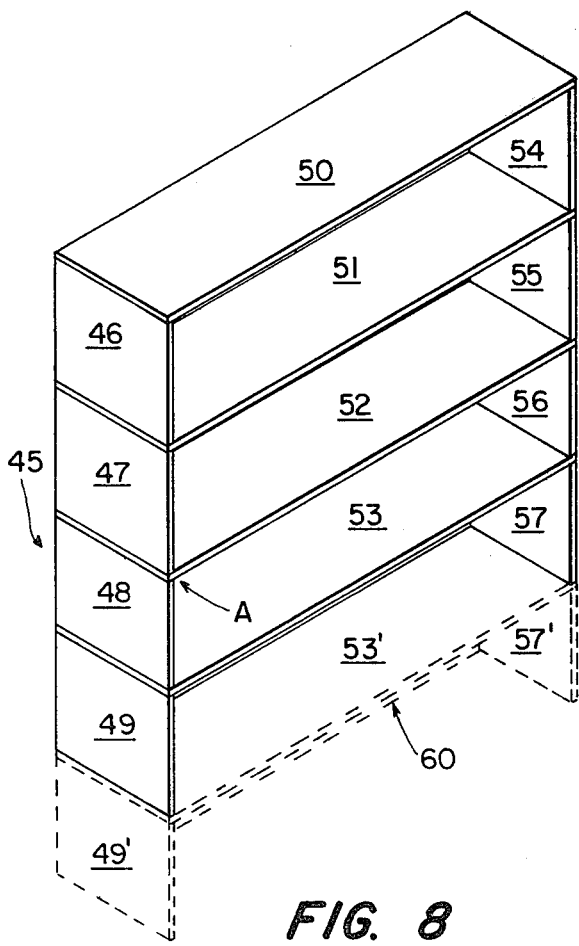
FIG. 8 is a perspective view of a furniture item, similar to FIG. 5, but wherein the sides of the furniture item are formed as a set of coplanar panels rather than as a single panel.

FIG. 8 illustrates a furniture item 45 similar to the furniture item 35 of FIG. 5 but with the difference that the single end panels 36 and 41 are replaced by sets of coplanar panels 46-49 and 54-57, respectively. A plurality of first generally parallel shelves 50 through 53 are also illustrated. The numeral 60 represents the optional back panel.

Since the set of end panels comprise a plurality of panels located end-to-end, they of course do not provide the same vertical rigidity as a single panel. However, this embodiment of FIG. 8 has various other utilities. First, if it is desired to give it greater vertical rigidity than it inherently possesses, one can simply add a vertical bar or the like to provide the sets of end panels with such additional rigidity. The advantage of the FIG. 8 arrangement is its modular nature, i.e. one set including elements 46, 50 and 54, another set including elements 47, 51 and 55, etc., with any number of additional panels represented in dotted lines by 49', 53' and 57'. Also, if the shelf structure is to be mounted from above, it may of course be used as a shelf since vertical rigidity of the end panels is then not required. Additionally, if a back panel 60 is used and the embodiment of FIG. 8 is turned on its side with the panel 60 as the bottom, there is provided a partitioned container wherein the customer may purchase as many sections of the container as desired.

Figure 9:
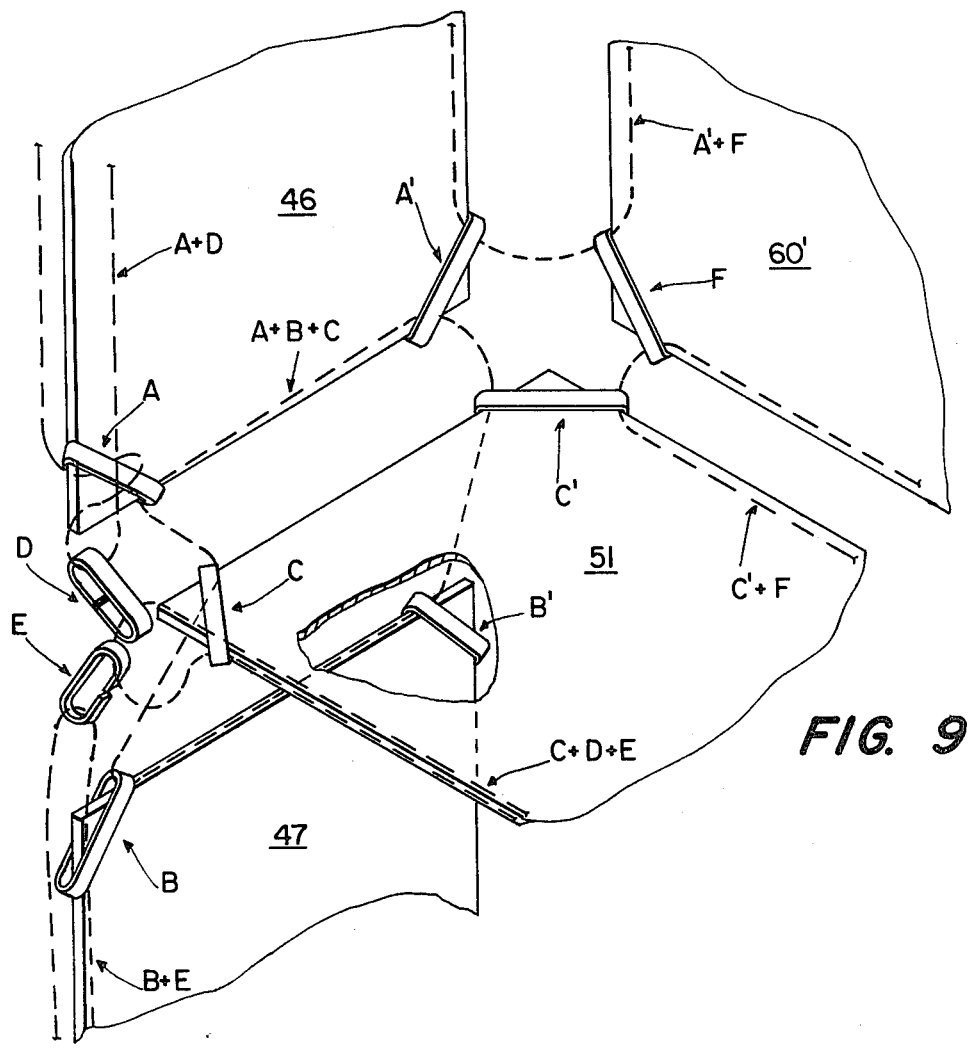
FIG. 9 is an enlarged schematic perspective view showing the intersection of three of the panels of FIG. 8 with all of the elements of the support system also shown.
Figure 9A:
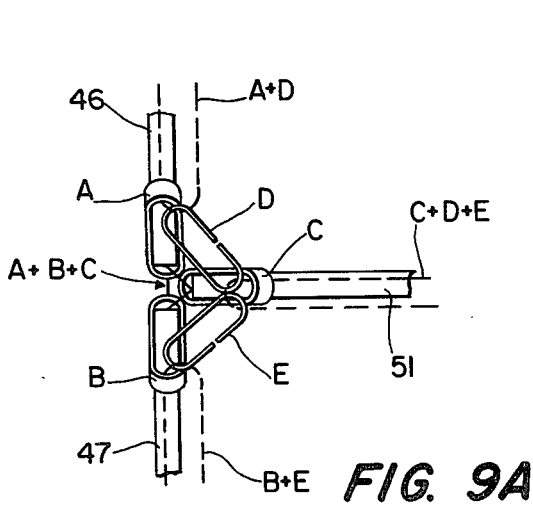
FIG. 9A is a schematic front elevational view of a portion of FIG. 8, taken in the direction of the arrow A of FIG. 8 and showing schematically the elements of the support system thereat.

Connecting together three panels which come together along a line such as panels 51, 46 and 47 involves a type III connection and this is illustrated at the front of FIG. 9 and also in FIG. 9A. In this case the collars are referred to by capital letters and the cords are referred to by the groups of collars which they engage. In addition to corner collars A, B and C on panels 46, 47 and 51, respectively, there is provided a pair of strut collars D and E. In this case an elastic member along the front of the horizontal panel 51 engages collars C, D and E, and is therefore identified as C+D+E. The vertical elastic member along the front of panel 46 engages collars A and D while the elastic member along the front of panel 47 engages collars B and E. The elastic member extending along the front to back edges of panels 46, 47 and 51 does not utilize the strut collars D and E. Rather, a single elastic member engages collars A, B and C, and is therefore identified as A+B+C. The positioning of all of these collars and the elastic members in use are better illustrated in front schematic view 9A.

Figure 9B:
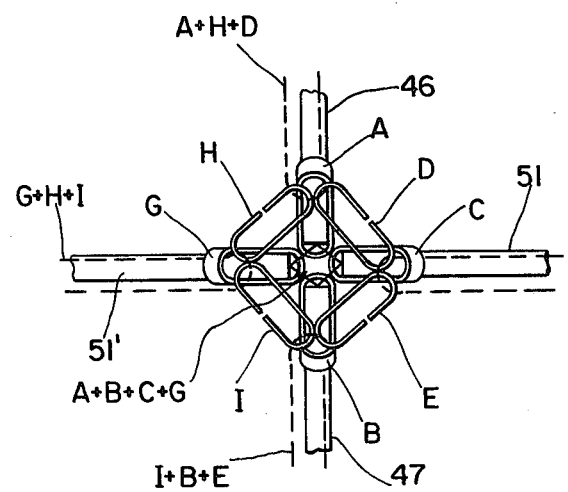
FIG. 9B is similar to FIG. 9A but includes an additional fourth panel not present in FIGS. 8, 9 or 9A.

Just as FIG. 6B illustrated how the embodiment of FIG. 5 could be extended laterally indefinitely, FIG. 9B illustrates how this can be accomplished with the embodiment of FIGS. 8 and 9. In a manner which is essentially apparent since it simply adds on to what is shown in FIGS. 9 and 9A, the additional panel 51' would include a corner collar G, a pair of strut collars H and I and an additional elastic member G+H+I. The cords along the fronts of panels 46 and 47 would now also engage collars H and I, respectively. Similarly, along the parallel edges of panels 46, 47, 51, 51', the cord A+B+C would now also engage collar G and be identified as A+B+C+G.

The embodiment of FIGS. 8 and 9 may be provided with either a single back panel 60 as represented in dotted lines in FIG. 8 or a separate back panel for each vertical section of the structure as shown in dotted lines at 60' of FIG. 9. In either case, the connection of the panels 46, 47 and 51 to the back panel or panels would constitute a type IIIA connection. If a single back panel were used, then as shown in FIG. 6, it would involve simply providing corner collars thereon and seeing that the upper and lower elastic members along that back panel engage those respective collars on the back panel. Alternatively, if individual back panels 60' were provided, as shown in FIG. 9, then each panel 60' would include corner collars as shown at F. In this case the corner collar on 46 is labeled A' and the corner collar on panel 51 is labeled C'. The upper elastic member similar to A+D at the front would simply engage collar F instead of strut D and become elastic member A'+F. Similarly, the elastic member in the back similar to C+D+E would instead engage C' and F and become cord C'+F (but if a further panel 60' were provided below the illustrated panel 60' then cord C'+F would of course also engage the collar on the upper left corner thereof).

Just as there was described earlier with respect to FIG. 7A alternative collar arrangements which could be used with the type II intersections of FIGS. 6, 6A and 6B, so too, variations are possible with the type III connections shown in FIGS. 9, 9A and 9B. In this case since the shelf panel meets a pair of vertical panels at the edges thereof, there will always be corner panels A and B so that there will be not need for a floating collar such as collar L or side struts M or N. However, since these three corner collars A, B and C are provided, it may be quite sufficient in some cases to use only those collars and eliminate the strut collars D and E. For example, in an open book shelf, i.e. a structure similar to FIG. 9 but without the back panel 60', the provision of strut collars D and E at one end of the edge of panel 51 might provide sufficient rigidity so that no strut collars would be necessary at the other end of that edge, i.e. even in the absence of panel 60', the three collars A', B' and C' might be sufficient.

Figure 10:
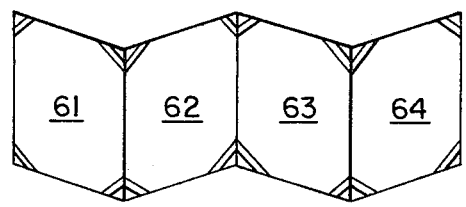
FIG. 10 is a perspective schematic view showing a simple room divider in the form of a screen, which can be formed in accordance with the present invention.

The various features of the support system as described above can also be utilized to assemble large panels into virtually any conceivable configuration of vertical panels for dividing a large area into a smaller area. Examples would include setting up an office and also setting up display areas for a convention, show or the like. FIG. 10 illustrates a simple arrangement of a plurality of panels 61-64 side by side, each panel having corner collars and elastic members around all of their edges in the simplest manner. The panels could then be folded on themselves, i.e. they would form a conventional screen type partition.

Figure 10A:
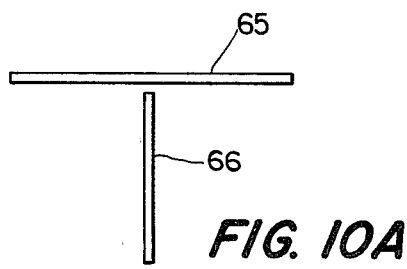
FIGS. 10A, 10B, 10C and 10D are each plan views of examples of room divider arrangements which can be formed in accordance with the present invention.
Figure 10B:
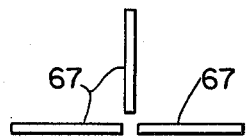

FIG. 10A illustrates a simple arrangement with a panel 66 engaging midway along panel 65. These panels would be connected utilizing the type II connection of FIG. 6, realizing that looking down on panels 65 and 66 would be similar to looking in from the front of the panels 36 and 39 of FIG. 6. Similarly, in FIG. 10B three panels 67 meeting along a common vertical line would be connected by type III connections of the type seen by looking in the front of FIG. 9, onto panels 46, 47 and 51.

Figure 10C:
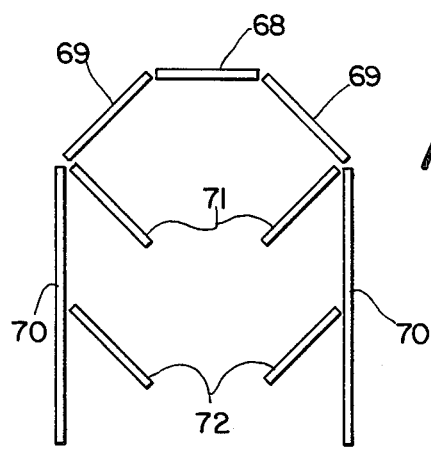
Figure 10D:
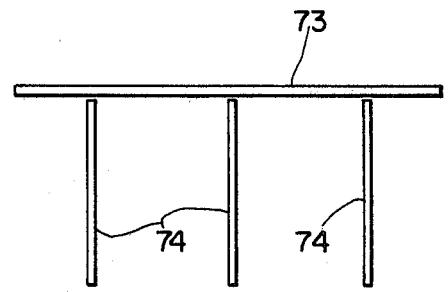

It will be understood that such panels can be arranged in a virtually limitless number of configurations. Merely as examples, FIG. 10C illustrates a possible office arrangement with a main back office formed by panels 68-71 and an outer area formed by side panels 70 and partitions 72. At a convention wherein booths are arranged side by side, one might use the configuration of FIG. 10D with a common back panel 73 connected to a plurality of forwardly extending panels 74 defining the individual booths.

Figure 11:
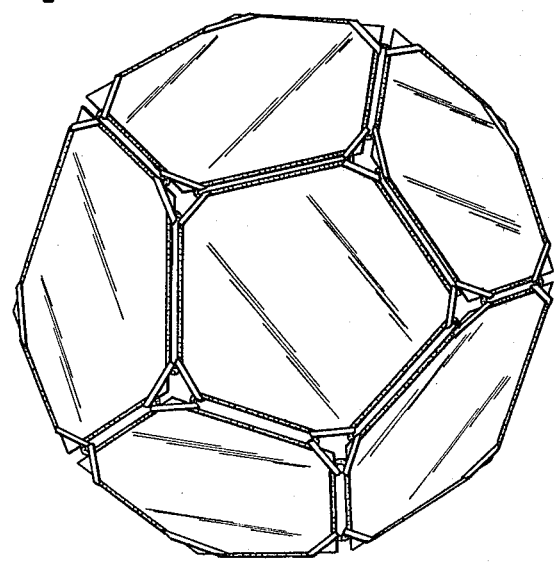
FIG. 11 is a perspective view of a toy made in accordance with the present invention.

As a toy the present invention may take many forms such as "Lego" and other presently known sets wherein building units and connecting means are provided for constructing a virtually limitless number of shapes; or a set of limited number of pieces and cords may be provided for constructing a certain shape such as a minature of the structure described above. Another type of toy would comprise a plurality of identical regular polygonal pieces such as triangles, squares, etc., for forming regular polyhedrons of various shapes. The latter are sometimes referred to as "executive toys". As example of the latter, with pentagonal pieces assembled into a regular polyhedron is shown in FIG. 11.

The structures described above in the present application all have the advantage of ease of assembly and disassembly as well as the advantages of simplified shipping and storage. These advantages might be particularly suitable for temporary use such as for students, military personnel, young married couples, for hotels, motels and the like. The various display arrangements, in addition to being useful as permanent displays in retail and wholesale establishments, may be used at trade shows where they would be set only temporarily and then taken down.

Although the invention has been described in considerable detail with respect to preferred embodiments thereof, it will be apparent that the invention is capable of numerous modifications and variations apparent to those skilled in the art, without departing from the spirit and scope of the invention, as defined in the claims.

I claim:

1. A building structure having side walls and a roof formed of separate panels connected together by a support system, each of said panels having a plurality of corners, and said support system comprising essentially non-stretchable collars mounted on said panel corners and elastic members connecting at least some of the collars together such that groups of adjacent collars on juxtaposed panels are connected together at their proximate ends by a said elastic member, and at least some of the said groups of collars are connected to other groups of collars which are spaced from the first group by tensioned elastic members stretched between the said groups of collars, such that the collars are capable of being releasably held in place on their respective panel corners to releasably hold all of the panels under the tension of the elastic members in the predetermined shape of the building structure.

2. A building structure according to claim 1, comprising a gabled roof.

3. A building structure according to claim 1, said roof being flat and extending horizontally.

4. A building structure according to claim 1, said building structure having further panels forming internal partitions.

5. A building structure according to claim 1, wherein at least some of said collars are formed as an elongated member bent into a loop with the ends close together but not connected to each other, and wherein said elastic members are formed as closed loops.

6. A building structure according to claim 1, wherein said elastic members are shock cords of the type comprising an elongated elastic member with hooks at opposite ends thereof.

7. A building structure according to claim 6, wherein said collars are formed as closed loops.

8. A furniture item having a plurality of generally parallel first panels and one panel abutting each opposite end of the first panels and lying in planes generally perpendicular to the planes of the first panels, each of said panels of said furniture item having a plurality of corners, and said panels being connected together to form the furniture item by a support system comprising essentially non-stretchable collars mounted on said panel corners and elastic members connecting at least some of the collars together such that groups of adjacent collars on juxtaposed panels are connected together at their proximate ends by a said elastic member, and at least some of the said groups of collars are connected to other groups of collars which are spaced from the first group by tensioned elastic members stretched between the said groups of collars, such that the collars are capable of being releasably held in place on their respective panel corners to releasably hold all of the panels under the tension of the elastic members in the predetermined shape of the furniture item.

9. A furniture item according to claim 8, wherein at the juncture on a corner of a first panel with an edge of an end panel at an intermediate point along the length of said edge, a pair of strut collars are provided and are connected on the one hand to an elastic member extending along an edge of the first panel and on the other hand to elastic members which are connected directly or indirectly to collars on the corners of that end panel at the ends of said edge.

10. A furniture item according to claim 8, including floating collars connecting adjacent elastic members extending along said edge of the end panel.

11. A furniture item according to any one of claims 8, 9 or 10, said furniture item being a table with the first panels extending in horizontal planes and the end panels forming vertical upright supports for said table.

12. A furniture item according to any one of claims 8, 9 or 10, said furniture item being a set of shelves with the first panels extending in horizontal planes and forming the shelves.

13. A furniture item having a plurality of generally parallel first panels and one end panel abutting each opposite end of the first panels and lying in planes generally perpendicular to the planes of the first panels, and including a back panel lying in a plane generally perpendicular to the planes of the first panels and the end panels, each of said panels of said furniture item having a plurality of corners, and said panels being connected together to form the furniture item by a support system comprising essentially non-stretchable collars mounted on said panel corners and elastic members connecting at least some of the collars together such that groups of adjacent collars on juxtaposed panels are connected together at their proximate ends by a said elastic member, and at least some of the said groups of collars are connected to other groups of collars which are spaced from the first group by tensioned elastic members stretched between the said groups of collars, such that the collars are capable of being releasably held in place on their respective panel corners to releasably hold all of the panels under the tension of the elastic members in the predetermined shape of the furniture item.

14. A furniture item according to claim 13, wherein at the juncture on a corner of a first panel with an edge of an end panel at an intermediate point along the length of said edge, a pair of strut collars are provided and are connected on the one hand to an elastic member extending along an edge of the first panel and on the other hand to elastic members which are connected directly or indirectly to collars on the corners of that end panel at the ends of said edge.

15. A furniture item according to claim 13, including floating collars connecting adjacent elastic members extending along said edge of the end panel.

16. A furniture item according to any one of claims 13, 14 or 15, said furniture item being a set of shelves enclosed at the rear with the first panels extending in horizontal planes and forming the shelves, the end panels forming vertical upright supports for the furniture item and the back panel forming the back of the furniture item.

17. A furniture item according to any one of claims 13, 14 or 15, said furniture item being an open top partitioned container with the back panel forming the bottom, the outer first panels and the end panels forming the upright sides of the container and the intermediate first panels forming upright partitions within the container.

18. A furniture item having a plurality of general parallel first panels and a generally co-planar panel set at each of the first panels, each panel set abutting its respective ends of the first panels and lying in a plane generally perpendicular to the first panels, all of said panels having a plurality of corners, said panels connected together to form the furniture item by a support system comprising essentially non-stretchable collars mounted on said panel corners and elastic members connecting at least some of the collars together such that group of adjacent collars on juxtaposed panels are connected together at their proximate ends by a said elastic member, and at least some of the said groups of collars are connected to other groups of collars which are spaced from the first group by tensioned elastic members stretched between the said groups of collars, such that the collars are capable of being releasably held in place on their respective panel corners to releasably hold all of the panels under the tension of the elastic members in the predetermined shape of the furniture item.

19. A furniture item according to claim 18, wherein the end of a first panel abuts edges of a pair of panels of a panel set such that three panel edges are in close proximity to each other along their lengths, and wherein, at the junction of the corner of that first panel and the corners of the said pair of panels, a pair of strut collars are provided, one of said strut collars being connected on the one hand to an elastic member connected to the first panel and on the other hand to an elastic member of one of the panels of the pair, and the other strut collar being connected on the one hand to said elastic member connected to the first panel and on the other hand to an elastic member connected to the other panel of the pair.

20. A furniture item according to claim 19, including an elastic member located along the said three edges in close proximity to each said edge and engaging all three corner collars on the corners of the three panels at said junction.

21. A furniture item according to any one of claims 18, 19 or 20, said furniture item being a set of shelves with the first panels extending horizontally and forming the shelves.

22. A furniture item according to claim 21, including further strengthening means to maintain the panels of each panel set upright and co-planar to each other.

23. A furniture item having a plurality of generally parallel first panels, and a generally co-planar panel set at each of the first panels, each panel set abutting its respective ends of the first panels and lying in a plane generally perpendicular to the plane of the first panels, and at least one back panel lying in a plane perpendicular to both the first panels and the said sets of panels, all of said panels having a plurality of corners, and said panels being connected together to form the furniture item by a support system comprising essentially non-stretchable collars mounted on said panel corners and elastic members connecting at least some of the collars together such that groups of adjacent collars on juxtaposed panels are connected together at their proximate ends by a said elastic member, and at least some of the said groups of collars are connected to other groups of collars which are spaced from the first group by tensioned elastic members stretched between the said groups of collars, such that the collars are capable of being releasably held in place on their respective panel corners to releasably hold all of the panels under the tension of the elastic members in the predetermined shape of the furniture item.

24. A furniture item according to claim 23, wherein the end of a first panel abuts edges of a pair of panels of a panel set such that three panel edges are in close proximity to each other along their lengths, and wherein, at the junction of the corner of that first panel and the corners of the said pair of panels, a pair of further collars are provided, one of said further collars being connected on the one hand to an elastic member connected to the first panel and on the other hand to an elastic member of one of the panels of the pair, and the other further collar being connected on the one hand to said elastic member connected to the first panel and on the other hand to an elastic member connected to the other panel of the pair.

25. A furniture item according to claim 24, including an elastic member located along the said three edges in close proximity to each said edge engaging all three corner collars on the corners of the three panels at said junction.

26. A furniture item according to any one of claims 23, 24 or 25, said furniture item being a set of shelves enclosed at the rear with the first panels extending horizontally and forming the shelves, and each panel set forming the vertical portions of the furniture item and with the back panel forming the back of the furniture item.

27. A furniture item according to any one of claims 23, 24 or 25, said furniture item being an open top partitioned container with the back panel forming the bottom thereof, with the outer first panels and the said panel sets forming the upright sides of the container, and wherein the intermediate first panels between the outer first panels form upright partitions within the container.

28. A partition structure for dividing off a large area into smaller areas comprising a plurality of vertical panels arranged in a predetermined configuration, each of said panels having a plurality of corners, and said panels connected together by a support system which comprises essentially non-stretchable collars mounted on said panel corners and elastic members connecting at least some of the collars together such that groups of adjacent collars on juxtaposed panels are connected together at their proximate ends by a said elastic member, and at least some of the said groups of collars are connected to other groups of collars which are spaced from the first group by tensioned elastic members stretched between the said groups of collars, such that the collars are capable of being releasably held in place on their respective panel corners to releasably hold all of the panels under the tension of the elastic members in the predetermined shape of the partitioned structure.

29. A partition structure according to claim 28, said structure including at least one juncture of an edge of a first panel with a line on a second panel intermediate its side edge, wherein at the juncture of a corner of a first panel with said edge there is provided a pair of strut collars connected on the one hand to an elastic member extending along an edge of the first panel and on the other hand to elastic members which are connected directly or indirectly to collars on the ends of said edge of the second panel.

30. A partition structure according to claim 28 or claim 29, including a floating collar connecting adjacent elastic members along said edge of the second panel.

31. A partition structure according to claim 28, said structure including at least one juncture of three vertical panel edges which are generally parallel to each other and in close proximity to each other, and wherein at the junction of the corners of said three edges each corner includes a said collar, and including a pair of strut collars extending from a first one of said panels, on each side thereof, towards another one of said panels, each of said strut collars connected on the one hand by an elastic member to the said first panel and on the other hand by another elastic member to collars on one or the other of said other panels.

32. A partition structure according to claim 31, incuding an elastic member located along the said three edges in close proximity to each said edge engages all three corner collars on the corners of the panels at said junction.

33. A partition structure according to any one of claims 8, 13, 18, 23, or 28, wherein at least some of said collars are formed as an elongated member bent into a loop with the ends close together but not connected to each other, and wherein said elastic members are formed as closed loops.

34. A partition structure according to any one of claims 8, 13, 18, 23 or 28, wherein said elastic members are shock cords of the type comprising an elongated elastic member with hooks at opposite ends thereof.

35. A partition structure according to claim 34, wherein said collars are formed as closed loops.

36. A toy comprising a set of panels having corners, elongated essentially non-stretchable collars shaped to fit onto the corners of the panels, and elastic cords shaped to be connected to two collars and stretched therebetween, the panels, collars and cords being such that groups of adjacent collars on juxtaposed panels are connected together at their proximate ends by a said elastic member, and at least some of the said groups of collars are connected to other groups of collars which are spaced from the first group by tensioned elastic members stretched between the said groups of collars, such that the collars are capable of being releasably held in place on their respective panel corners to releasably hold all of the panels under the tension of the elastic members in the predetermined shape of a toy.

37. A toy according to claim 36, wherein the set comprises a sufficient member of panel pieces of identical shape to each other as well as the necessary quantity of collars and cords to form a regular polyhedron, the panel pieces being of a relatively small size easily hand assembled into the desired shape.

* * * * *